(12) United States Patent
Kurczveil et al.

(10) Patent No.: US 11,539,440 B2
(45) Date of Patent: Dec. 27, 2022

(54) INJECTION SEEDING OF A COMB LASER

(71) Applicant: Hewlett Packard Enterprise Development LP, Houston, TX (US)

(72) Inventors: Geza Kurczveil, Santa Barbara, CA (US); Di Liang, Santa Barbara, CA (US); Sudharsanan Srinivasan, Santa Barbara, CA (US); Raymond G. Beausoleil, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 18 days.

(21) Appl. No.: 16/947,056

(22) Filed: Jul. 16, 2020

(65) Prior Publication Data

US 2022/0021459 A1 Jan. 20, 2022

(51) Int. Cl.
*H04B 10/00* (2013.01)
*H04B 10/50* (2013.01)
*H04J 14/00* (2006.01)

(52) U.S. Cl.
CPC ....... *H04B 10/506* (2013.01); *H04B 10/5057* (2013.01)

(58) Field of Classification Search
CPC ............... H04B 10/506; H01S 3/10084; H01S 3/10092; H01S 5/40; H01S 5/4006
See application file for complete search history.

(56) References Cited

U.S. PATENT DOCUMENTS

| | | | |
|---|---|---|---|
| 5,530,709 A | 6/1996 | Waarts et al. | |
| 6,233,045 B1 * | 5/2001 | Suni | G01P 3/366 356/5.1 |
| 7,099,586 B2 | 8/2006 | Yoo | |
| 8,842,998 B2 | 9/2014 | Delfyett et al. | |
| 9,088,371 B2 | 7/2015 | Witzens | |
| 9,287,993 B1 | 3/2016 | Adleman et al. | |
| 9,385,506 B2 | 7/2016 | Anandarajah et al. | |
| 10,243,328 B2 | 3/2019 | Zhang et al. | |
| 10,320,515 B1 | 6/2019 | Koch et al. | |
| 2003/0034538 A1 | 2/2003 | Brophy et al. | |
| 2004/0233945 A1 | 11/2004 | Komine et al. | |
| 2005/0013337 A1 | 1/2005 | Jung et al. | |
| 2014/0161148 A1 | 6/2014 | Osinki et al. | |

(Continued)

OTHER PUBLICATIONS

Kobayashi et al., "Automatic frequency control in a semiconductor laser and an optical amplifier", Journal of Lightwave Technology, vol. 1, No. 2, Jun. 1983, pp. 394-402.

(Continued)

*Primary Examiner* — Daniel G Dobson
(74) *Attorney, Agent, or Firm* — Sheppard Mullin Richter & Hampton LLP (57) ABSTRACT

Examples herein relate to optical systems. In particular, implementations herein relate to an optical system including an optical transmitter configured to transmit optical signals. The optical transmitter includes a first optical source and a second optical source coupled to the first optical source and injection seeded by the first optical source. The optical transmitter further includes an output coupler, the second optical source coupled to the optical coupler via an output waveguide and configured to emit light having multiple different wavelengths through the output waveguide. In some implementations, the second optical source is self-injection seeded.

9 Claims, 7 Drawing Sheets

(56) References Cited

U.S. PATENT DOCUMENTS

| | | | |
|---|---|---|---|
| 2016/0119057 A1 | 4/2016 | De Dobbelaere et al. | |
| 2017/0010419 A1 | 1/2017 | Jiang | |
| 2017/0090268 A1 | 3/2017 | O'Sullivan | |
| 2018/0212682 A1 | 7/2018 | Chen et al. | |
| 2018/0294622 A1 | 10/2018 | Liang et al. | |
| 2019/0020419 A1 | 1/2019 | Pelc et al. | |
| 2019/0028203 A1* | 1/2019 | Kuse | H04J 14/02 |
| 2019/0113686 A1 | 4/2019 | Matres et al. | |
| 2019/0310422 A1 | 10/2019 | Seyedi et al. | |
| 2019/0393962 A1* | 12/2019 | Zhang | G02F 1/21 |
| 2020/0119813 A1 | 4/2020 | Zhang et al. | |
| 2021/0088740 A1 | 3/2021 | Liang et al. | |
| 2022/0019023 A1 | 1/2022 | Ren et al. | |

OTHER PUBLICATIONS

Liang et al., "Heterogeneous Silicon light Sources for Datacom Applications", Optical Fiber Technology 44, Elsevier Inc., 2018, pp. 43-52.

Vasseur et al., "Alternate Multiwavelength Picosecond Pulse Generation by Use of an Unbalanced Mach-Zehnder Interferometer in a Mode-locked Fiber Ring Laser", IEEE Journal of Quantum Electronics, vol. 43, No. 1, Jan. 2007, pp. 85-96.

Vasseur et al., "Alternate Multiwavelength Modelocked Fiber Laser", IEEE Photonics Technology Letters, vol. 16, No. 8, Aug. 2004, pp. 1816-1818.

Wang Fei, "Tunable 12_10 GHz mode-locked semiconductor fiber laser incorporating a Mach-Zehnder interferometer filter", Optics & Laser Technology 43, 2011, pp. 848-851.

Geza et al., "On-chip Hybrid Silicon Quantum Dot Comb Laser With 14 Error-Free Channels", HPE, Jul. 2018, 3 pages.

Luecke et al., "Autostable injection locking of a 4x4 VCSEL array with on-chip master laser", SPIE Digital Library, May 1, 2000, 7 pages.

Pintus et al., "Broadband TE Optical Isolators and Circulators in Silicon Photonics Through Ce:YIG Bonding", Journal of Lightwave Technology, vol. 37, No. 05, Mar. 1, 2019, pp. 1463-1473.

RP Photonics "Encyclopedia of Laser Physics and Technology—injection locking, single-frequency laser", available online at <https://web.archive.org/web/20160419031911/https://www.rp-photonics.com/injection_locking.html>, Apr. 19, 2016, 2 Pages.

* cited by examiner

INJECTION SEEDING OF A COMB LASER

STATEMENT OF GOVERNMENT RIGHTS

This invention was made with Government support under Agreement Number H98230-18-3-0001. The Government has certain rights in the invention

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Wavelength division multiplexing (WDM) is useful for increasing communication bandwidth by combining and sending multiple different data channels or wavelengths from one or more optical sources over an optical fiber. Generally, optical systems or transmitters described herein include an optical source configured to emit multiple wavelengths via which data signals are transferred injection seeded by a reference optical source or self-injection seeded.

BRIEF DESCRIPTION OF THE DRAWINGS

Certain examples are described in the following detailed description and in reference to the drawings, in which.

DETAILED DESCRIPTION OF SPECIFIC EXAMPLES

The present disclosure describes various examples of optical systems (e.g., optical transceivers) that include an optical transmitter. According to embodiments as described herein, the optical transmitter includes a multi-wavelength optical source (e.g., a comb laser) injection seeded or self-injection seeded. For example, the multi-wavelength optical source can be injection seeded by a reference multi-wavelength or single wavelength optical source. In other examples, the multi-wavelength optical source can be self-injection seeded to or by itself (e.g. via mirrors or reflectors).

Typically, a comb laser chip includes a comb laser and an optical coupler. An optical spectrum of the comb laser includes multiple comb lines. Each respective comb line can be filtered out and modulated separately by, for example, an array of microring modulators coupled to an input waveguide (e.g., via an optical coupler).

In certain implementations according to the present disclosure, an optical transmitter includes a first optical source (a reference multi-wavelength or single wavelength optical source) and a second optical source coupled to the first optical source and injection seeded by the first optical source. The second optical source can be a multi-wavelength optical source (e.g., a comb laser). The optical transmitter further includes an optical coupler, the second optical source coupled to the optical coupler via an output waveguide and configured to emit light having multiple different wavelengths through the output waveguide to the optical coupler. In other examples, the second optical source can be self-injection seeded (e.g., without the first or reference optical source). In such configurations, the multi-wavelength second optical source can be self-injection seeded to or by itself (e.g. via mirrors or reflectors). An improved optical system or transmitter having an optical source injection seeded or self-injection seeded as described herein may provide one or more of the following advantages: an increase in the number of optical frequencies or comb lines, reducing amplitude noise or relative intensity noise in each comb line, or locking of independent lasers to a same reference wavelength grid. Further advantages and improvements with respect to certain implementations of the optical transmitters or systems described herein are discussed in more detail below.

An "optical fiber" as described herein can refer to a single optical fiber (e.g., including a core, a cladding, a buffer and one or more layers of protective jackets) to provide either unidirectional or bidirectional optical communication (e.g., both transmit and receive communications in an optical network). A signal or communication path of an optical fiber can extend contiguously and uninterrupted between optical modules. In other examples, the optical fiber includes an array of two or more fibers or two or more fibers connected (e.g., sequentially) via fiber-to-fiber connections such that the fibers function or perform as a single communication path. To avoid unnecessarily obscuring the description, conventional or well-known structures and components of optical systems are omitted from the description, for example, optical connectors, input waveguides, optical fibers, optical receivers, tuning circuitry, sensors, and CMOS drivers/receivers to tune, convert, or modulate optical signals or resonators.

FIGS. 1A-1D illustrate examples of optical transmitters 102 (identified individually as optical transmitters 102a-102d) and components thereof according to the present disclosure. The optical transmitters 102 are configured to transmit optical signals. Each of the optical transmitters 102 includes at least one optical source 104 coupled to an optical coupler 106 via an output waveguide 105 and configured to emit light (e.g., carrier waves) having different wavelengths or channels through the output waveguide 118 to the output coupler 106. The different wavelengths can then be filtered out and modulated separately by, for example, an array of microring modulators coupled to an input waveguide (not illustrated) via the output coupler 106 to modulate electrical data signals thereon. As generally known by those having ordinary skill in the art, the modulated signals can then be transmitted to an optical receiver (e.g., via an optical fiber or other waveguide).

The output waveguide 118 can be, for example, a bus waveguide. The output waveguide 118 couples light from the respective optical sources 104 to the optical couplers 106. Such optical couplers 106 can be, for example, a grating coupler. In other examples, the optical couplers 106 can include, but are not limited to a: prism, collimating lens, light-turn lens, parabolic reflector, spot-size converter, inversely tapered waveguide, bent waveguide, or a combination thereof. In other examples, the optical couplers 106 can be edge couplers.

The optical transmitters 102 further include a reference optical source 110. The optical source 104 is injection seeded by the reference optical source 110. In other words, light from the reference optical source 110 is injected into the optical source 104 (e.g., a comb laser). Injection of light from the reference optical source 110 into the optical source 104 can impact the output of the optical source 104 (e.g., shift the wavelength, reduce the amplitude noise, change the optical power).

The components of the optical transmitters 102 described herein can all be integrated or formed on or within a single chip, die, or photonic integrated circuit. For example, the optical source 104 and the reference optical source 110 can be heterogeneously integrated on a silicon or silicon on insulator substrate. In some examples, the optical source 104 and the reference optical source 110 can be monolithically grown or formed on a silicon or silicon on insulator substrate.

Figure 2A:
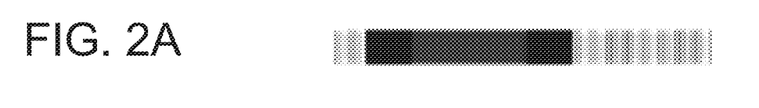
FIGS. 2A-2D schematically illustrate examples of reference optical sources that the optical sources of the optical transmitters described herein can be injection seeded according to the present disclosure.
Figure 2B:
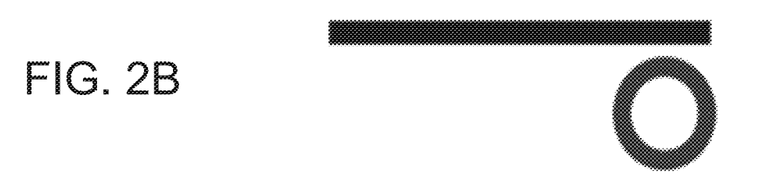
Figure 2C:
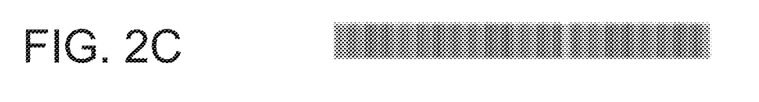
Figure 2D:
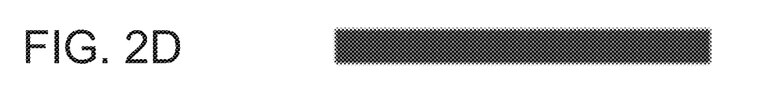

With reference to FIGS. 2A-2D, various types of reference optical sources 110 or lasers can be implemented with the optical transmitters 102 (e.g., depending on whether single wavelength injection or multi-wavelength injection into the optical source 104 is desired). For example, for single wavelength injection, a distributed Bragg reflector (DBR) laser (FIG. 2A), a ring laser (FIG. 2B), or a distributed feedback (DFB) laser (FIG. 2C) can be used. For multi-wavelength injection, a Fabry-Perot or a comb laser can be used (FIG. 2D). In some examples, single wavelength injection reference optical sources (e.g., DFB or DBR lasers) can provide a relatively low linewidth enhancement factor (e.g., a low alpha or Henry factor) which can make such lasers more tolerant to optical feedback from an injection seeded laser (e.g., optical source 104). Therefore, such lasers or other lasers with low linewidth enhancement factors can be suitable for isolator-free or circulator-free configurations or examples as described in more detail herein.

As described herein, in some implementations, the first optical source 104 can include a multi-wavelength comb laser configured to generate or output a plurality of different laser or comb lines (e.g., tones, frequencies, or wavelengths). The multi-wavelength comb laser output includes multiple optical frequencies with a fixed separation (e.g., the comb-teeth spacing) between any two adjacent frequencies. As described above, the output of different wavelengths can then be filtered out and modulated separately by, for example, an array of microring modulators or lasers coupled to the input waveguide to modulate electrical data signals thereon. The different wavelengths can be modulated with electrical data signals (e.g., modulated via tuning circuitry and external or integrated CMOS drivers) and then sent to an optical receiver (e.g., via an optical fiber).

The microring modulators or lasers can be, for example, directly-modulated ring lasers. In particular implementations, the ring lasers can be directly modulated quantum dot (QD) microring lasers having micro-cavities tunable (e.g., via bias or thermal tuning) to different resonant wavelengths corresponding to different respective wavelengths of the light emitted from the comb laser Referring back to FIGS. 1A-1D, light from the reference optical source 110 can be injected into the optical source 104 via a back mirror (FIGS. 1A-1B) or a front mirror (FIGS. 1C-1D) of the optical source 104. For example, the optical source 104 can be a QD comb laser having front and back mirrors 112 and 114 (FIGS. 1E-1G). The mirrors 112 and 114 can be disposed in a QD layer 116 of the QD comb laser (FIG. 1E), a waveguide of the QD comb laser the QD layer is disposed on or above (e.g., output waveguide 118, FIG. 1F), or both (FIG. 1G). In some examples, one of the mirrors (e.g., the back mirror 114) is disposed in the QD layer 116 and the other mirror (e.g., the front mirror 112) is disposed in the waveguide. The mirrors 112 and 114 can be used for optical feedback to reflect light in the waveguide. The mirrors 112 and 114 are typically designed such that they have low loss, broad reflection bandwidth, and cause a minimal amount of dispersion or compensate for dispersion introduced by a rest of a laser cavity of the QD comb laser. In some examples, one of the front and back mirrors 112 and 114 can have greater reflectivity than the other mirror to ensure that one mirror has a higher output power than the other.

As described above, during operation, light can be injected from the reference optical source 110 into the optical source 104 via the back mirror (e.g., back mirror 114) to injection seed the optical source 104. However, in some examples, light from the optical source 104 can also be injected into the reference optical source 110 as well such that it can impact the output of the reference optical source 110. This can lead to chaotic operation. Therefore, typically, an optical isolator 108 is inserted between the optical source 104 and the reference optical source 110 as illustrated in the example optical transmitter 102a of FIG. 1A and described in more detail below (FIGS. 2A-2B). The optical isolator 108 can ensure unidirectional injection seeding (e.g., injection of light from the optical source 110 into the optical source 104 only). However, in other examples, the optical transmitter 102b does not include an optical isolator between the optical source 104 and the reference optical source 110 (FIG. 1B). Careful device design is required to ensure that an isolator-free configuration will also not lead to chaotic operation (e.g., single wavelength injection reference optical sources 110 or that otherwise have low linewidth enhancement factor).

Figure 1A:
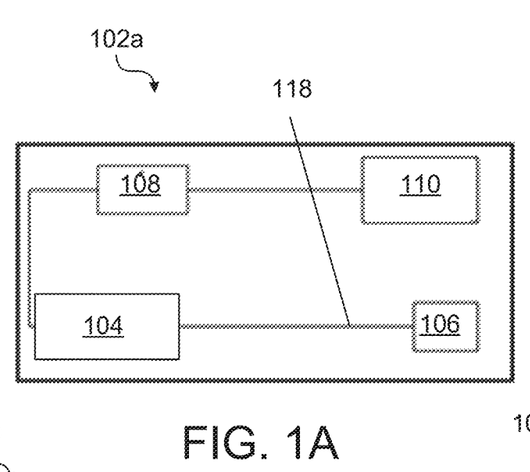
FIGS. 1A-1D schematically illustrate examples of injection seeded optical transmitters according to the present disclosure.
Figure 1B:
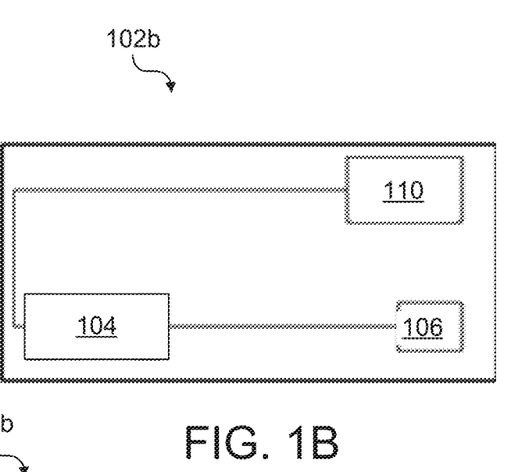
Figure 1C:
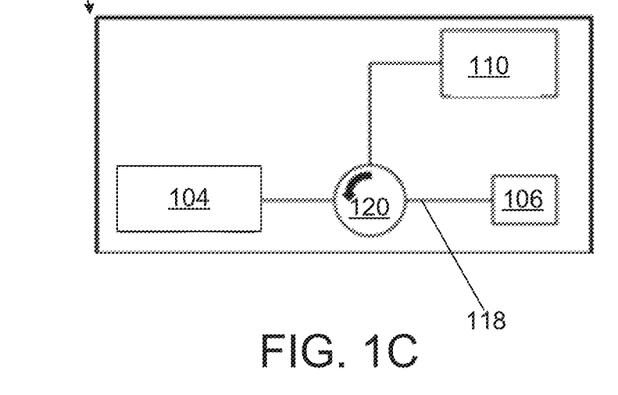

As illustrated in FIGS. 1A-1B, light is injected into the optical source 104 via or through the back mirror (e.g., the back mirror 114). However, as illustrated in other examples (FIGS. 1C-1D), light can also be injected via or through the front mirror (e.g., the front mirror 112) of the optical source 104. In the example of FIG. 1C, the optical transmitter 102c includes a circulator 120. Light from the reference optical source 110 is injected through the front mirror of the optical source 104 via the circulator 120. The circulator 120 can ensure that the light is injected from the reference optical source 110 to the optical source 104, while also ensuring that the output from the optical source 104 is only directed towards the optical coupler 106, and not towards the reference optical source 110. In certain examples, the circulator 120 ensures that no light is coupled from the optical source 104 or the optical coupler 106 to the reference optical source 110.

Figure 1D:
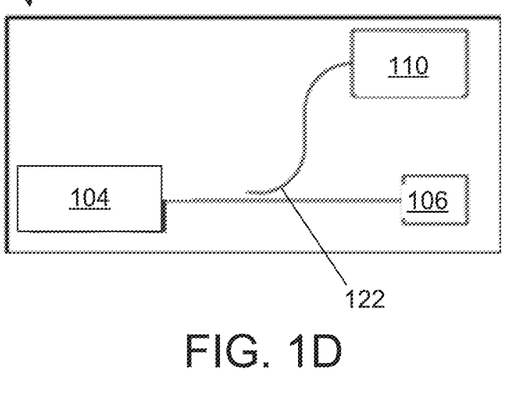
Figure 1E:
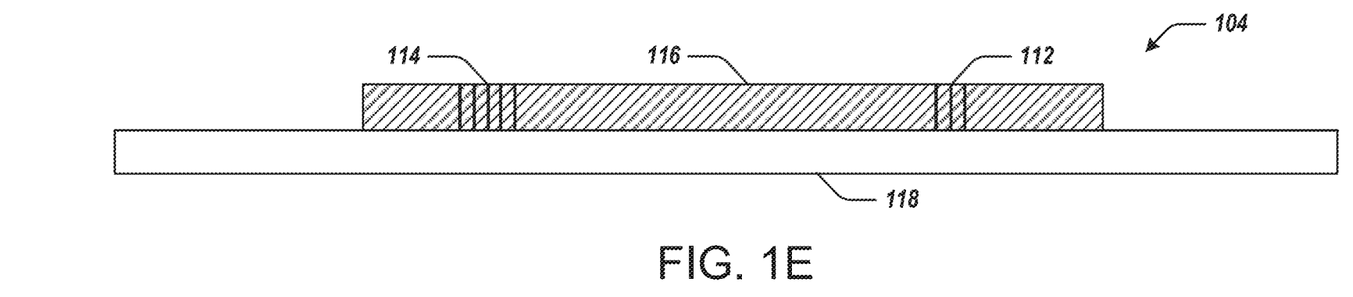
FIGS. 1E-1G schematically illustrate examples of optical sources of the optical transmitters of FIGS. 1A-1D according to the present disclosure.
Figure 1F:
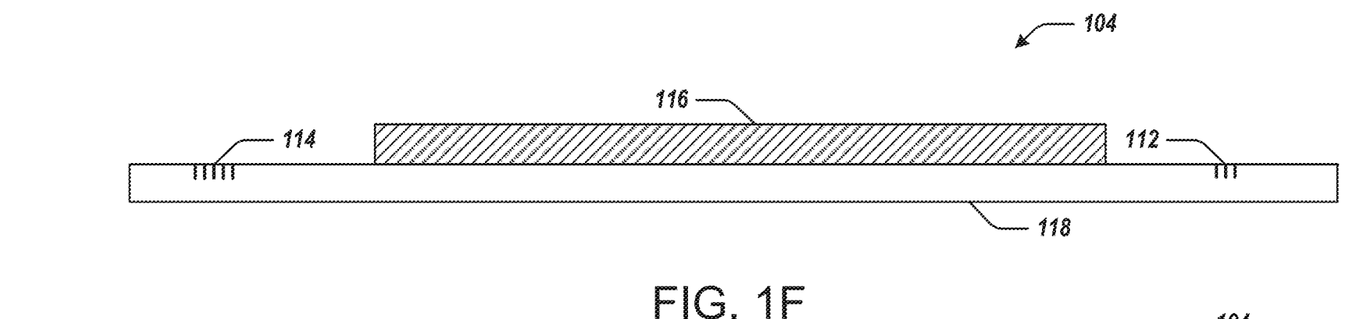
Figure 1G:
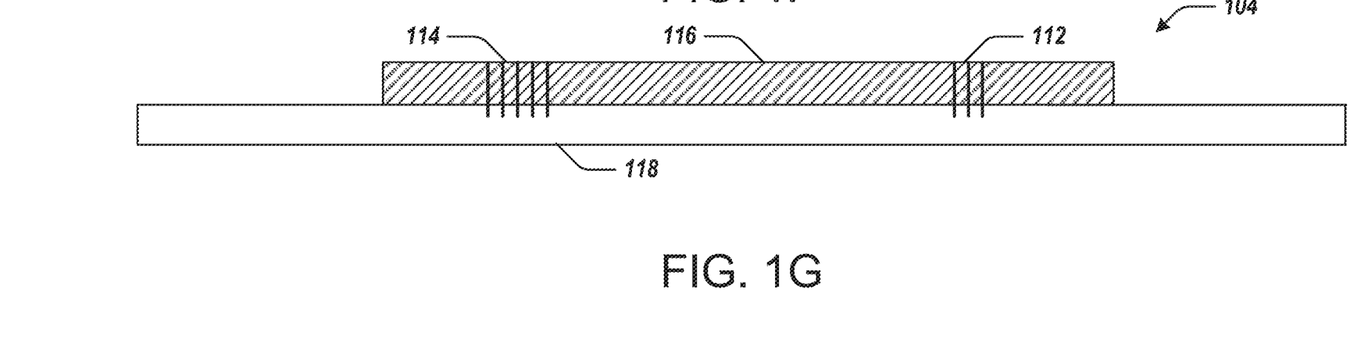

However, as similarly described above with respect to the optical transmitter 102a and the optical isolator 108, as illustrated in FIG. 1D, the optical transmitter 102d can be provided without the circulator 120. For example, the optical transmitter 102d includes an optical tap 122 (e.g., a 10% optical tap). The light is injected from the reference optical source 110 through the front mirror of the optical source 104 via the optical tap 122 without a circulator disposed therebetween. The reference optical source 110 in such examples can be a single wavelength injection reference optical source or lasers that otherwise have a low linewidth enhancement factor.

Figure 3A:
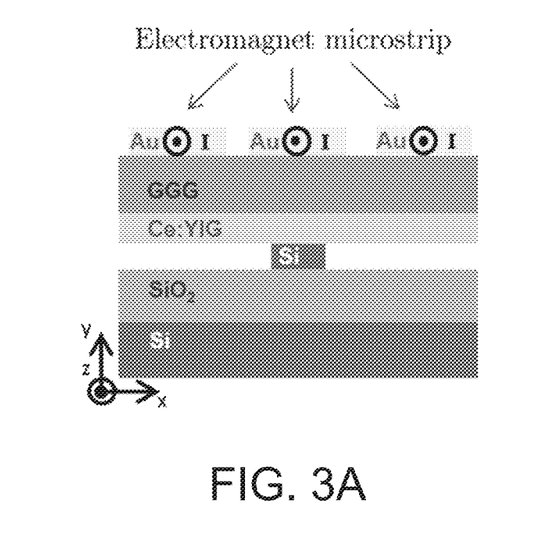
FIGS. 3A-3B schematically illustrate a section view of an example waveguide of an optical isolator or circulator and a top view of the example optical isolator or circulator that can be used with the injection seeded optical transmitters as described herein, respectively.
Figure 3B:
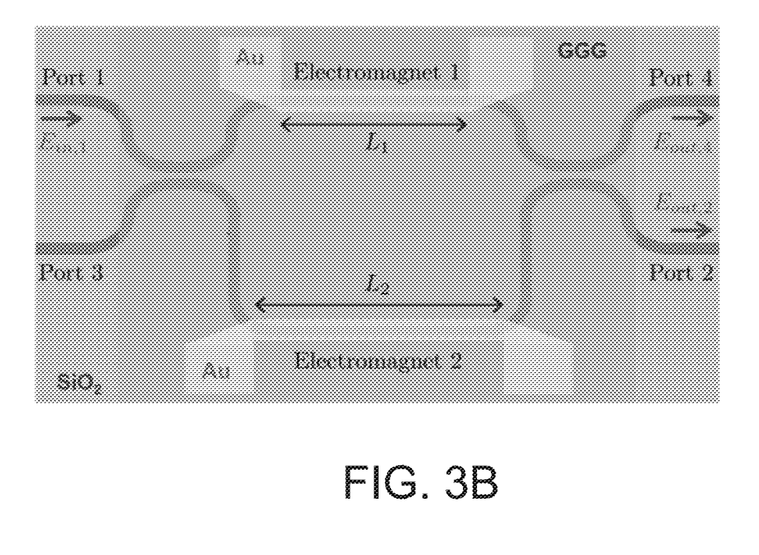

FIGS. 3A-3B illustrate details of an example optical isolator or circulator that can be provided with any of the optical transmitters as described herein. Such isolators and circulators can be integrated (e.g., on a same circuit or chip) as one or more of the other components of the optical transmitters. For examples, FIG. 3A illustrates a section view of a heterogeneous waveguide of a Mach-Zehnder interferometer (MZI) based isolator or circulator. FIG. 3B illustrates a top view of such an MZI based isolator or circulator having two arms. Each of the arms can include heterogeneous waveguides (FIG. 3A) and can be driven by integrated electromagnets with proportional lengths to induce a nonreciprocal phase shift. At least one of the arms includes a nonreciprocal waveguide. Other suitable isolators and circulators known to those with ordinary skill in the art can also be provided with the examples described herein.

Generally, isolators and circulators as described herein can be inherently difficult to integrate or otherwise realize on a photonic integrated chip or circuit with an on-chip multi-wavelength optical source. Therefore, an optical transmitter with an injection seeded optical source without an isolator or a circulator is highly desirable. In some examples, as described herein, an optical transmitter includes an optical source that is self-injection seeded. Such self-injection seeded optical sources can be implemented without an optical isolator or circulator. Various types of mirrors, as described in more detail below with respect to FIGS. 5A-5E, can be used to reflect some or all of the wavelengths of light back into the optical source such that the optical source is self-injection seeded. For example, the multi-wavelength optical source can be a comb laser, and a mirror can be coupled to the comb laser such that it reflects part or all of the comb laser's spectrum back into the comb laser as shown in FIGS. 4A-4D.

FIGS. 4A-4D illustrate examples of optical transmitters 402 (identified individually as optical transmitters 402a-402d) in accordance with the present disclosure. The optical transmitters 402 can include one or more of any of the components, in whole or in part, as described above with respect to the optical transmitters 102 (e.g., where similar reference identifiers refer to similar or identical components). For example, each of the optical transmitters 402 includes an optical source 404 (e.g., a multi-wavelength comb laser) coupled to an optical coupler 406 via an output waveguide 418 and configured to emit light (e.g., carrier waves) having different wavelengths or channels through the output waveguide 418. The different wavelengths can then be filtered out and modulated separately by, for example, an array of microring modulators coupled to an input waveguide coupled to the optical coupler 406 to modulate electrical data signals thereon (e.g., which can be sent to an optical receiver via an optical fiber).

The optical source 404 further includes front and back mirrors, similar or identical to the optical sources 102 described herein. For example, the optical source 404 can be a QD comb laser having front and back mirrors disposed in a QD layer of the QD comb laser, a waveguide of the QD comb laser the QD layer is disposed on or above (e.g., the output waveguide 418), or both. The mirrors can be used for optical feedback to reflect light in the waveguide. The mirrors are typically designed such that they have low loss, broad reflection bandwidth, and cause a minimal amount of dispersion or compensate for dispersion introduced by a rest of a laser cavity of the QD comb laser. In some examples, one of the front and back mirrors can have greater reflectivity than the other mirror to ensure that one mirror has a higher output power than the other. The front mirror, back mirror, or both can include filters or be configured with filtering capability. As such, light at one or more first wavelengths can be injection seeded as described in more detail below through the front or back mirrors while providing high reflectivity of light at one or more second wavelengths different from the one or more first wavelengths.

The optical source 404 is self-injection seeded. In other words, the optical source 404 does not include a separate or additional reference optical source (e.g., reference optical source 110) to inject light into the optical source 404. Thus, an optical isolator or circulator is not necessary. In contrast, the optical transmitters 402 include an additional mirror 430 to reflect light from the optical source 404 back into the optical source 404 through the front mirror or the back mirror such that the optical source 404 is self-injection seeded. In some examples, the optical source 404 and the mirror 430 are heterogeneously integrated on a silicon on insulator substrate.

Figure 4:
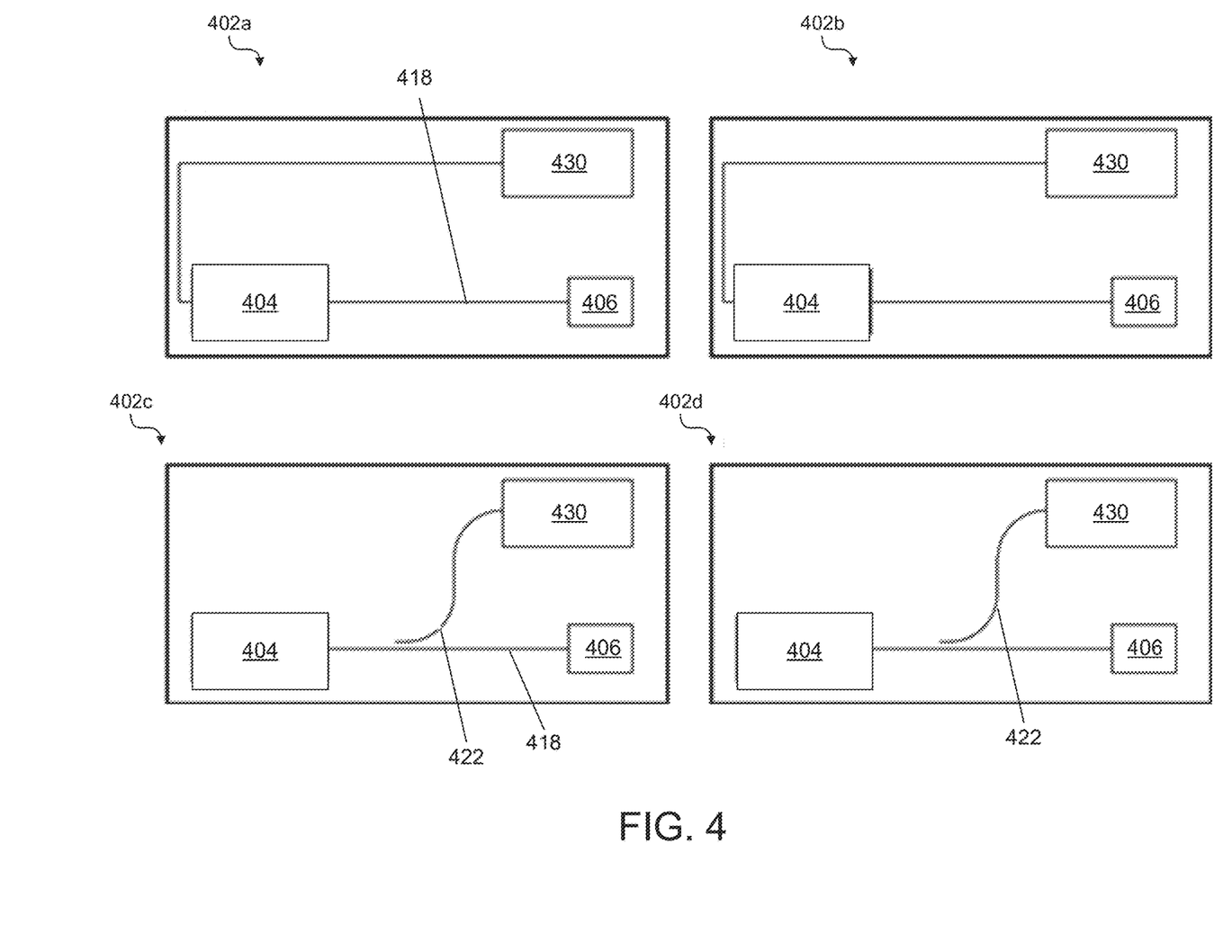
FIGS. 4A-4D schematically illustrate examples of self-injection seeded optical transmitters according to the present disclosure.
Figure 5A:
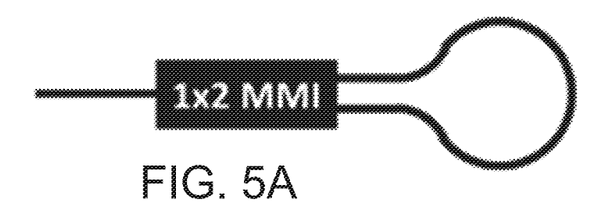
FIGS. 5A-5E schematically illustrate examples of mirrors that can be used with the self-injection seeded optical transmitters as described herein.
Figure 5B:
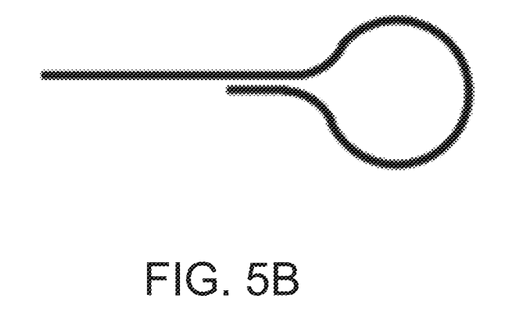
Figures 5C, 5D:
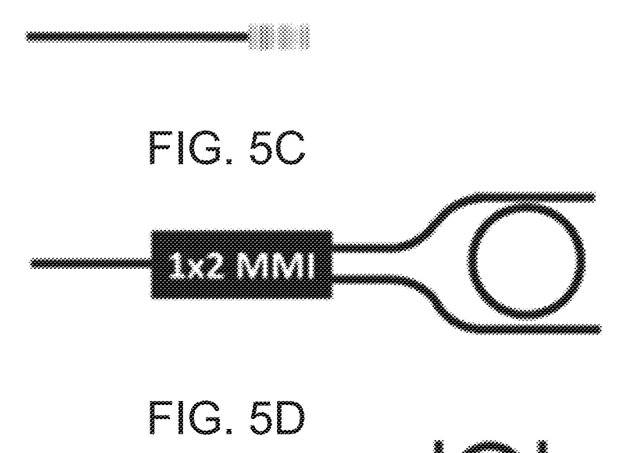
Figure 5E:
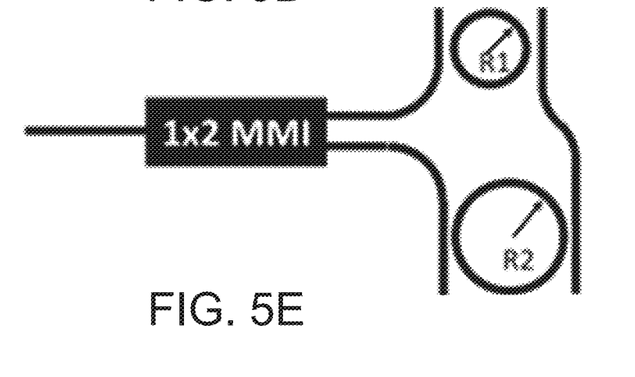

For example, as illustrated in the optical transmitters 402a and 402b of FIGS. 4A-4B, light is reflected back into the optical sources 404a and 404b via the front mirror by a single wavelength mirror (FIG. 4A) and a multi-wavelength mirror (FIG. 4B), respectively. In contrast, as illustrated in the optical transmitters 402c and 402d of FIGS. 4C-4D, light is reflected back into the optical sources 404c and 404d via the back mirror by a single wavelength mirror (FIG. 4C) and a multi-wavelength mirror (FIG. 4D), respectively. The optical transmitters 402c and 402d further include an optical tap 422 (e.g., a 10% optical tap) to reflect light back through the front mirror of each respective optical transmitter 402.

Various mirror designs for mirror 430 can be used depending on whether multiple wavelengths or a single wavelength reflection is desired (FIGS. 5A-5E). For example, an optical loop mirror with a multimode interference (MMI) coupler (e.g., a 1×2 MMI coupler) or without an MMI coupler (FIGS. 5A and 5B, respectively) or with a directional coupler, or a distributed Bragg reflector mirror (FIG. 5C) can be used to reflect multiple wavelengths back into the optical sources 404. In other examples, a ring resonator mirror with a directional coupler or a MMI coupler (FIG. 5D) or a ring resonator mirror with a directional coupler or a MMI coupler and multiple ring resonators (e.g., two or more having different radii R1 and R2, FIG. 5E). The ring resonator(s) of the ring resonator mirrors can be selectively tuned or biased to allow a desired wavelength or wavelengths to be reflected. As such, in some examples, when the optical source 404 is a multi-wavelength comb laser, the mirror 430 can be designed or configured to reflect a single wavelength, two or more wavelengths, or all of the comb laser's optical spectrum back into the comb laser (e.g., via self-injection seeding as described herein).

Figure 6A:
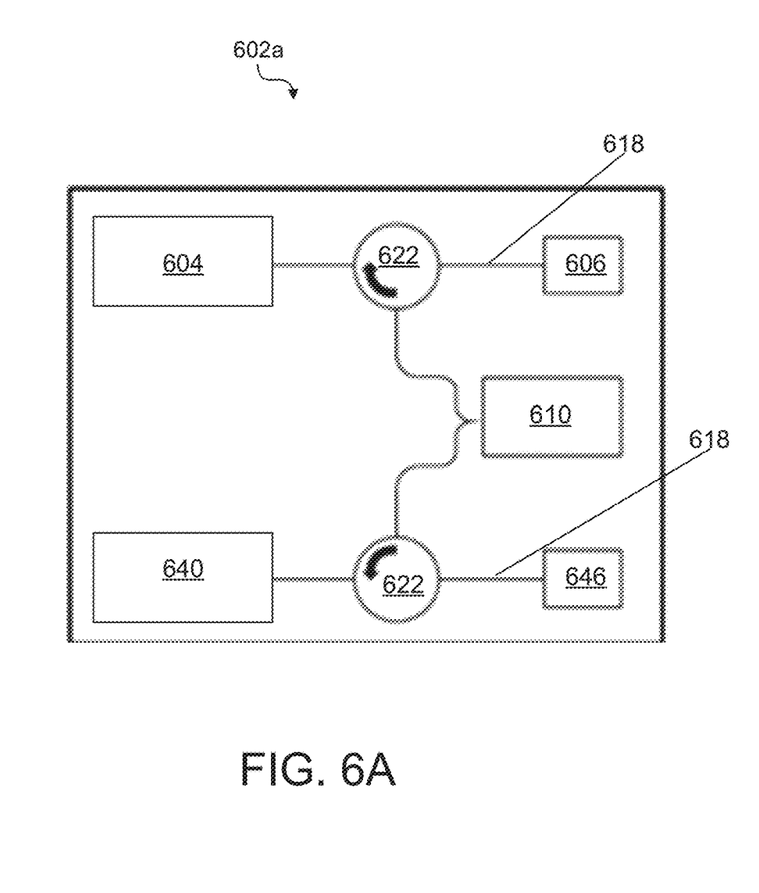
FIGS. 6A-6B schematically illustrate an example of an optical transmitter with multiple optical sources injection seeded by a single reference optical source and with multiple optical sources self-injection seeded by a common mirror, respectively, according to the present disclosure.
Figure 6B:
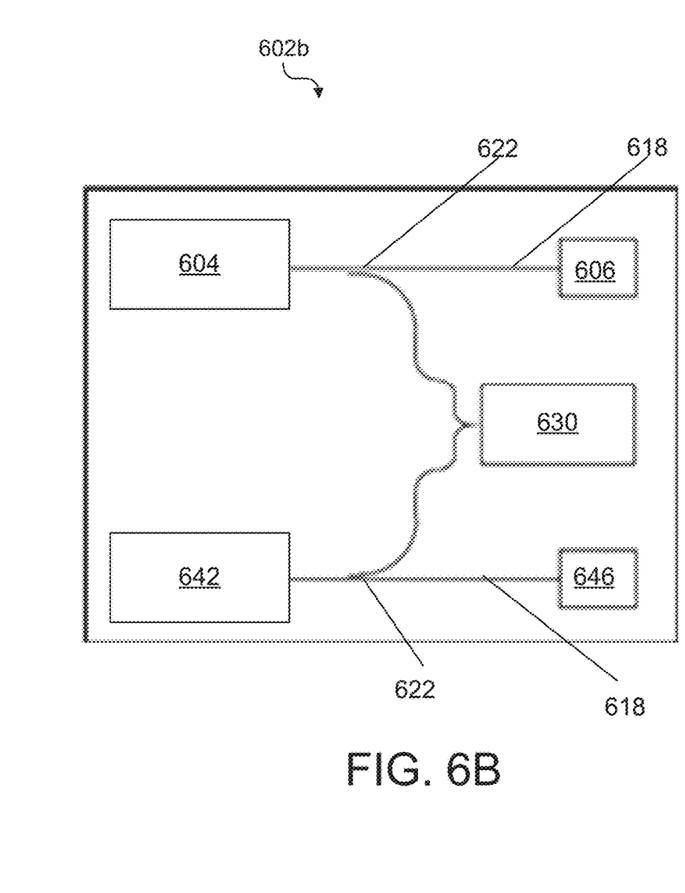

With reference to FIGS. 6A-6B, optical transmitters 602 (identified individually as optical transmitters 602a and 602b) are illustrated. The optical transmitters 602 can be configured similarly or identically to the optical transmitters 102 and 402 as described above. The optical transmitters 602 includes one or more components, in whole or in part, as the optical transmitters 102 and 402. For example, as illustrated in FIG. 6A, the optical transmitter 602a is configured to transmit optical signals. The optical transmitter 602a includes a first optical source 610 (e.g., a reference optical source) and a second optical source 604 coupled to the first optical source 610. The second optical source 604 is injection seeded by the first optical source 610. The optical transmitter 602a further includes an optical coupler 606. The second optical source 604 is coupled to the optical coupler 606 via an output waveguide 618. The second optical source 604 is configured to emit light having multiple different wavelengths through the output waveguide 618 and the optical coupler 606. In certain examples, the second optical source 604 can be a comb laser.

The optical transmitter 602a further includes a third optical source coupled 640 to the first optical source 610. The third optical source 640 is also injection seeded by the first optical source 610. In this manner, both the second optical source 604 and the third optical source 640 can be aligned to one or more same reference wavelengths of the first optical source 610. In other words, independent optical sources (e.g., second and third optical sources 604 and 640) can be locked to a same wavelength grid (e.g., the wavelength grid of the first optical source 610).

The third optical source 640 can also be coupled to an optical coupler 646 via an output waveguide 618. The third optical source 640 is configured to emit light having multiple different wavelengths through the output waveguide 618 and the optical coupler 646. In certain examples, the third optical source 640 can also be a comb laser. The light from the injection seeded second and third optical sources 604 and 640 can then be modulated with electrical data signals and sent to an optical receiver via respective optical fibers. In other examples, the light from the injection seeded second and third optical sources 604 and 640 can be modulated with electrical data signals and multiplexed or otherwise combined to be sent to an optical receiver via a single optical fiber.

As illustrated in FIG. 6A, the light from the first optical source 610 can be injection seeded through respective front mirrors of the second and third optical sources 604 and 640 via respective circulators 620. In other examples, the light from the first optical source 610 can be injection seeded through respective front mirrors of the second and third optical sources 604 and 640 without circulators 620 via respective optical taps.

In further examples, the light from the first optical source 610 can be injection seeded through respective back mirrors of the second and third optical sources 604 and 640 via respective isolators as described herein. In yet other examples, the light from the first optical source 610 can be injection seeded through respective back mirrors of the second and third optical sources 604 and 640 without such isolators disposed therebetween as described herein.

In another example, illustrated in FIG. 6B, the optical transmitter 602b is configured to transmit optical signals. The optical transmitter 602b includes an optical source 604 including a front mirror and a back mirror and configured to emit light having multiple different wavelengths. The optical transmitter further includes a mirror 630 coupled to one of the front mirror (e.g., as illustrated in FIG. 6B) or the back mirror of the optical source 604. The mirror 630 reflects one or more of the wavelengths back into the optical source 604 through the front mirror (e.g., as illustrated in FIG. 6B) or the back mirror such that the optical source 604 is self-injection seeded. In this manner, the optical transmitter 602b can be configured without an optical isolator or circulator between the front mirror or back mirror of the optical source 604 and the mirror 630. The optical transmitter 602b also includes an optical coupler 606. The optical source 604 is coupled to the optical coupler 606 via an output waveguide 618 to emit the light through the output waveguide 618 and the optical coupler 606.

The optical transmitter 602b further includes a second optical source 642 comprising a front mirror and a back mirror and configured to emit light having multiple different wavelengths. The mirror 630 is also coupled to one of the front mirror (e.g., as illustrated in FIG. 6B) or the back mirror of the second optical source 642. The mirror reflects one or more of the wavelengths back into the second optical source 642 through the front mirror (e.g., as illustrated in FIG. 6B) or the back mirror such that the optical sources 604 and 642 are self-injection seeded to or by one or more same wavelengths. As such, the optical transmitter 602b can also be configured without an optical isolator or circulator between the front mirror or back mirror of the second optical source 642 and the mirror 630. In some examples, the optical sources 604 and 642 of the optical transmitter 602b are first and second comb lasers aligned to one or more same wavelengths via the mirror 630. As illustrated, both front mirrors of the first and second optical sources 604 and 642 can be coupled to the mirror 630 via respective optical taps 622. In other examples, both back mirrors of the second optical sources 604 and 642 can be coupled to the mirror 630.

Various types of mirrors 630 can be used to reflect the light back into the optical sources 604 and 642 (e.g., as illustrated in FIGS. 5A-5E). For example, the mirror 630 can be a single wavelength mirror to reflect a single wavelength back into the optical sources 604 and 642. In other examples, the mirror 630 can be a multi-wavelength mirror to reflect multiple wavelengths back into the optical sources 604 and 642. As such, the optical sources 604 and 642 can be self-injection seeded such that they are both aligned to a single wavelength or multiple wavelengths (e.g., depending on the type of mirror 630).

An improved optical system or transmitter having an optical source injection seeded or self-injection seeded as described herein may provide one or more of the following advantages: an increase in the number of optical frequencies or comb lines, reducing amplitude noise or relative intensity noise in each comb line, or locking of independent lasers to a same reference wavelength grid. In the foregoing description, numerous details are set forth to provide an understanding of the subject disclosed herein.

However, implementations can be practiced without some or all of these details. Other implementations can include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect (e.g., having additional intervening components or elements), between two or more elements, nodes, or components; the coupling or connection between the elements can be physical, mechanical, logical, optical, electrical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. An optical transmitter configured to transmit optical signals, the optical transmitter comprising:
a first optical source;
a second optical source coupled to the first optical source and injection seeded to the first optical source;
an optical coupler, the second optical source coupled to the optical coupler via an output waveguide and configured to emit light having multiple different wavelengths through the output waveguide to the output coupler; and
an optical tap, wherein light from the first optical source is injected into the second optical source via the optical tap.

2. The optical transmitter of claim 1, wherein the first optical source and the second optical source are integrated on a single photonic integrated circuit.

3. The optical transmitter of claim 1, wherein the first optical source comprises at least one of: a distributed Bragg reflector laser, a ring laser, a distributed feedback laser, a Fabry-Perot laser, or a comb laser.

4. The optical transmitter of claim 1, wherein the second optical source comprises a multi-wavelength comb laser, the comb laser comprising a front mirror and a back mirror.

5. The optical transmitter of claim 4, wherein the light from the first optical source is injected into the second optical source via the optical tap through the back mirror.

6. The optical transmitter of claim 5, wherein the light from the first optical source is injected into the second optical source without passing through an optical isolator disposed between the first optical source and the second optical source.

7. The optical transmitter of claim 4, wherein the light from the first optical source is injected into the second optical source via the optical tap through the front mirror.

8. The optical transmitter of claim 1, further comprising a third optical source coupled to the first optical source and injection seeded by the first optical source such that both the second optical source and the third optical source are aligned to one or more same reference wavelengths of the first optical source.

9. The optical transmitter of claim 1, wherein the first and second optical sources are first and second comb lasers aligned to one or more same wavelengths via a mirror.

* * * * *